UNITED STATES PATENT OFFICE 2,571,679

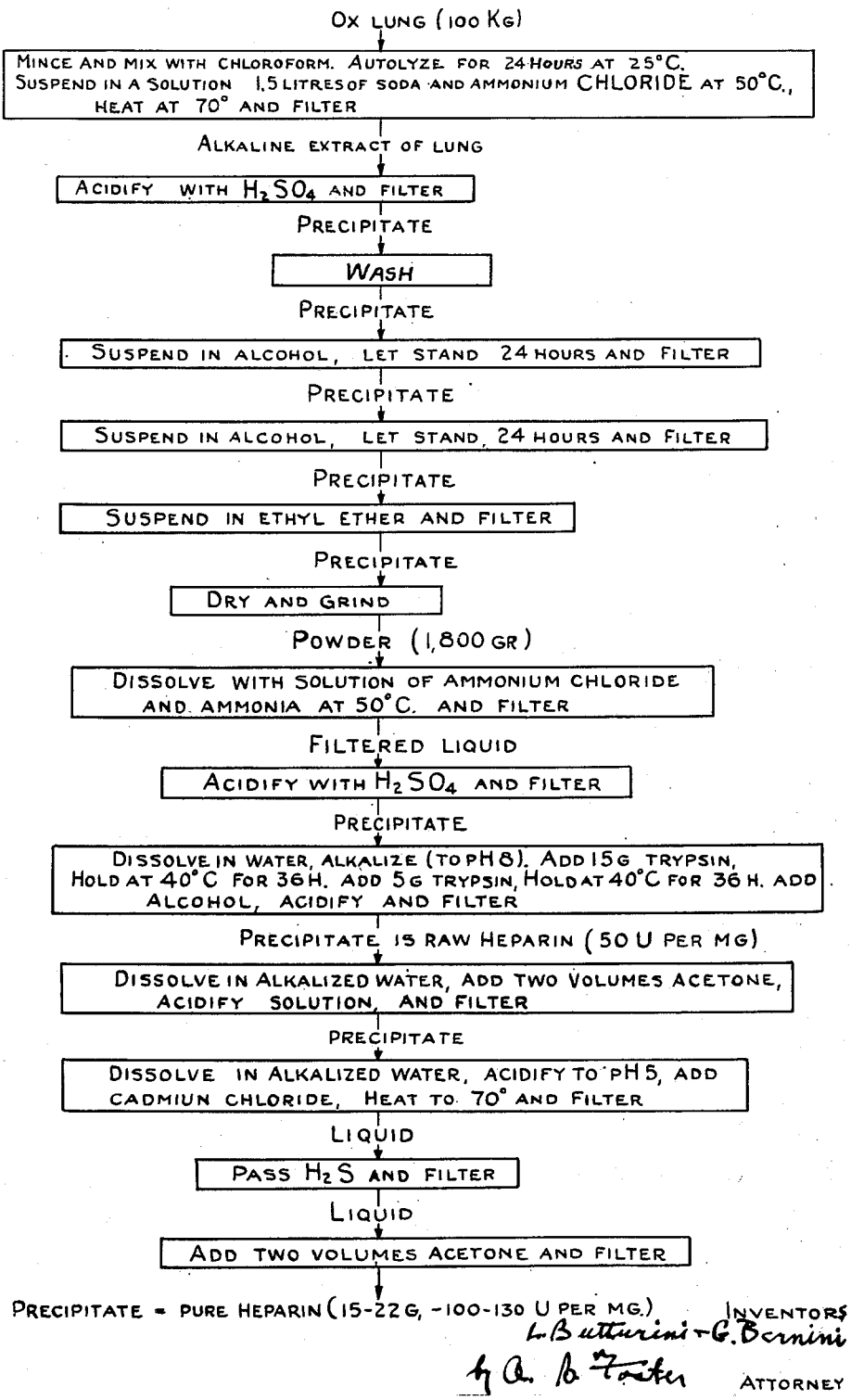

PROCESS FOR PREPARING PURIFIED HEPARIN

Luigi Butturini, Milan, and Giuseppe Bernini, Melegnano, Italy, assignors to Carlo Erba S. A., Milan, Italy, a firm Application July 8, 1948, Serial No. 37,525

4 Claims. (Cl. 167—74)

Extraction of heparin from ox lungs for therapeutical purposes has been known and practiced for some time, with several processes, such as, for instance, the Charles and Scott process. According to that process, extraction is carried out on the minced lung, after autolysis, with a solution of sodium hydroxide and ammonium sulphate. From extracted liquid a precipitate is obtained by acidifying. This is then washed with water and ethanol and digested with trypsin, after which the active fraction is precipitated with alcohol; then the precipitate is dissolved again with water and precipitated again with acetone.

The raw heparin thus obtained is then purified by several known methods. Now we have found that if purification is carried out on the material extracted from the lung, before tryptic digestion, a raw heparin is obtained, with which final purification proves to be much easier and to give considerably higher yields as compared to the former processes.

According to the present invention, the product obtained by extraction of the autolyzed ox lung, with an alkaline solution, and precipitation with an acid, is subjected to at least one washing treatment, followed by drying, then the dried material is further treated with an alkaline solution; the suspension thus obtained is filtered and the filtrate acidified to precipitate the active fraction which is collected on a filter. This is subjected to digestion with trypsin, after which the material can be purified by conventional methods.

Even if leaving the other steps of the known process unaltered, it is possible to obtain an increase in yield by employing as the alkaline solution for extraction, a solution of sodium hydroxide and ammonium chloride (instead of the solution of sodium hydroxide and ammonium sulphate, used heretofore).

In order to more clearly and fully illustrate the invention, a detailed example of the process is described hereinafter, which example is not intended to limit the scope of the invention as claimed in the appended claims.

100 kg. of fresh ox lung are very finely minced and intimately mixed with 1500 cm.³ of commercial grade chloroform. The whole mass is then put into a closed container in a thermostat at 25° C. for 24 hours.

Then a solution is prepared of 136 liters water, 9.4 liters 30% solution of sodium hydroxide and 9.7 kg. ammonium chloride. To this solution, the autolyzed lung is added. This mixture is then heated to attain coagulation of the material which is then filtered through a linen cloth and allowed to drain. A turbid liquor is obtained, which then is acidified with sulphuric acid. A bright flocculent precipitate is thus formed, which is then filtered through paper. The precipitate is collected, washed, accurately suspended in 40 liters ethyl alcohol and left at rest for at least 24 hours. Then it is filtered through paper and the precipitate is again suspended in 40 liters of alcohol. After further 24 hours, the suspension is filtered and the precipitate is suspended in 40 liters of ether.

The suspension is filtered and the fine powder is dried under vacuum. In this way, about 1800 grammes of a dry substance are obtained, which after having been finely pulverised, is again suspended in 60 liters of 0.5 N ammonia containing 3.6 kg. of ammonium chloride. The suspension is heated up to 50° C. for one hour under slow stirring, and then filtered through paper.

The limpid liquor (filtrate from this last filtration) is acidified with sulphuric acid, thus causing a white flocculent precipitate to be formed, which is filtered through paper and washed with water previously acidulated with sulphuric acid. The precipitate is collected, dissolved in lukewarm water, and after adjusting the pH-value to about 8 by means of sodium hydroxide, there is added 15 grammes of trypsin. The solution is covered with a layer of toluene, stirred and put into a thermostat at 40° C. After 36 hours, further 5 grammes of trypsin are added and the liquor is left at rest in the thermostat for further 36 hours. At the end of digestion, 10 liters of 95° ethyl alcohol are added. The liquor is then acidified with hydrochloric acid and allowed to settle.

The residue (solid matter so settled out) is dissolved in 2.5 liters of diluted water solution of sodium hydroxide, the limpid solution is precipitated by adding two volumes of acetone and by acidifying with hydrochloric acid. After sedimentation, the precipitate is dissolved again in two liters of water previously made alkaline by means of sodium hydroxide, then it is acidified to a pH-value of 5 and a solution of cadmium chloride is added until there be no longer any formation of precipitate. After heating up to 70° C. this is filtered through paper and the liquid is subjected to a quick flow of hydrogen sulphide gas to precipitate the excess of cadmium as sulphide, and then again filtered through paper. To the filtrate 2 volumes of acetone are added and the formation of precipitate is assisted by stirring. After 12 hours, the precipitate is collected, dehydrated with ethyl alcohol and dried with ether. The yields are about 15-22 grammes of heparin, the titration standard of which is from 100 to 130 Toronto units/mg.

The annexed drawing is a flow sheet showing the main treatments of the material, according to the specific example, to which the invention is not restricted.

We claim:

1. A process for the preparation of heparin, comprising extraction from autolyzed ox lung with solution of sodium hydroxide and ammonium chloride, acidifying such extract to cause precipitation, washing the so obtained precipitate with a volatile solvent and drying it, treating the dried residue with an alkaline solution, filtering the suspension thus obtained, acidifying the filtered solution to obtain a precipitate, subjecting said last mentioned precipitate to digestion with trypsin, precipitating heparin with alcohol and separating the heparin by filtration.

2. A process for the preparation of heparin, comprising extraction from autolyzed ox lung with solution of sodium hydroxide and ammonium chloride, acidifying such extract to cause precipitation, washing the so obtained precipitate twice with alcohol and further with ether with subsequent drying, treating the final dried residue with an alkaline solution, filtering the suspension thus obtained, acidifying the filtered solution to obtain a precipitate by filtration subjecting said precipitate to tryptic digestion, precipitating the heparin with alcohol and separating the heparin by filtration.

3. A process for the preparation of heparin, comprising extraction from autolyzed ox lung with solution of sodium hydrate and ammonium chloride, acidifying such solution to cause precipitation, washing several times the so obtained precipitate with volatile solvent with subsequent drying, treating the dried residue with a solution of ammonia and ammonium chloride, filtering the suspension thus obtained, acidifying the filtered solution to obtain a precipitate and subjecting said last mentioned precipitate to digestion with trypsin precipitating the heparin with alcohol and separating the heparin by filtration.

4. A process for the preparation of heparin, comprising extraction with a solution of sodium hydroxide and ammonium chloride from autolyzed ox lung while intimately admixed with chloroform, acidifying such solution to cause precipitation, washing the so obtained precipitate with a volatile solvent and drying it, treating the dried residue with an alkaline solution, filtering the suspension thus obtained, acidifying the filtered solution to obtain a precipitate and subjecting said last mentioned precipitate to digestion with trypsin and precipitating the heparin with alcohol and separating the heparin by filtration.

LUIGI BUTTURINI.
GIUSEPPE BERNINI.

REFERENCES CITED

The following references are of record in the file of this patent:

UNITED STATES PATENTS

| Number | Name | Date |
|---|---|---|
| 2,377,016 | Kuizenga | May 29, 1945 |
| 2,410,084 | Kuizenga | Oct. 29, 1946 |

FOREIGN PATENTS

| Number | Country | Date |
|---|---|---|
| 712,564 | Germany | Oct. 21, 1941 |

OTHER REFERENCES

Charles—Studies on Heparin, J. Biol. Chem. (1933), vol. 102, pp. 425, thru 448; pp. 426 and 427, 429, 432, 433, esp. relied upon.

Kuizenga—J. Biol. Chem., vol. 148, June 1943, pp. 641–647.